Figure 1:
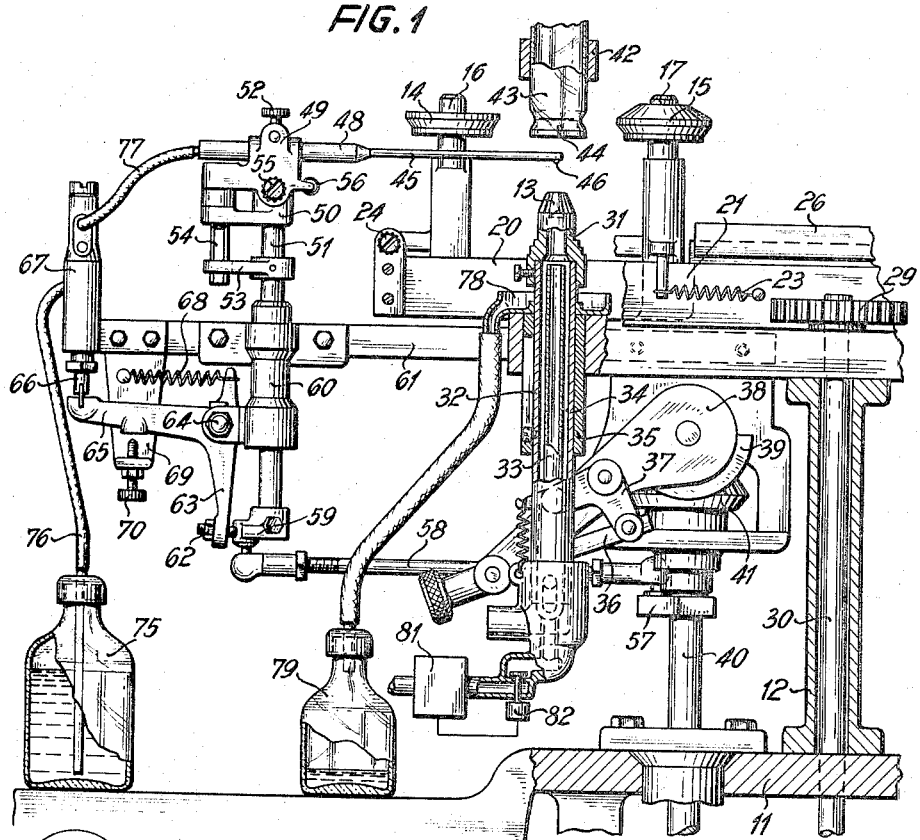

Sept. 19, 1967  J. DICHTER  3,342,575
MACHINE FOR RESHAPING THE NECK PORTION OF SMALL
GLASS BOTTLES WITH LUBRICATING MEANS
Filed Sept. 18, 1963  3 Sheets-Sheet 1

INVENTOR
JAKOB DICHTER
BY Albert C. Johnston
ATTORNEY

Sept. 19, 1967  J. DICHTER  3,342,575
MACHINE FOR RESHAPING THE NECK PORTION OF SMALL
GLASS BOTTLES WITH LUBRICATING MEANS
Filed Sept. 18, 1963  3 Sheets-Sheet 3

INVENTOR
JAKOB DICHTER
BY Albert C. Johnston
ATTORNEY

United States Patent Office 3,342,575
Patented Sept. 19, 1967

3,342,575
MACHINE FOR RESHAPING THE NECK PORTION OF SMALL GLASS BOTTLES WITH LUBRICATING MEANS
Jakob Dichter, Waldmeisterstrasse 4, Berlin-Dahlem, Germany
Filed Sept. 18, 1963, Ser. No. 309,828
Claims priority, application Germany, Sept. 18, 1962, D 39,869
9 Claims. (Cl. 65—170)

This invention relates to machines for the automatic manufacture of small glass bottles.

Machines for the automatic manufacture of relatively small glass bottles, e.g. tubes or phials for medicaments, are frequently so designed that suitable component sections are separated by melting from travelling lengths of vertically arranged glass tubes, which sections then travel along a circular path through several processing stations, at which more especially the open bottle rim is smoothed and bulged and finally the bottle neck is formed. An example of such a machine is to be seen in German patent specification No. 1,011,592.

It is usual in such cases to effect the formation of the bottle neck by means of shaping elements, usually in the form of profiled rolls, which are disposed facing one another, the end of the revolving workpiece being gripped between said rolls. Since in this case the bottle rim is disposed in the region of a burner, but in any case is soft enough to be deformed, it is inverted over a mandrel which is for example conical and which serves as a guiding and holding means. However, this produces the difficulty that the soft glass in certain circumstances sticks to the mandrel and is damaged or destroyed.

Some assistance has hitherto been given in this respect by the mandrel being manually provided as required with a lubricant, e.g. by brushing on the lubricant. However, apart from the fact that this readily leads to irregularities and results in crust formations, not sufficient is done in this way as regards the automatic working procedure.

The invention is concerned with improving the function of the mandrel lubrication on the machines as set forth, and to make this automatic and to adapt it to the given working conditions. This is effected by a lubricating member which, in synchronism with the working cycle of the machine, provides the mandrel which is not occupied at the time with a predetermined quantity of lubricant. Such a lubricating member, which is expediently connected to a piston pump of adjustable delivery stroke, is usually seated in a headpiece which, pivotable about a shaft, is controlled by a driving mechanism effecting the starting and stopping motion.

In this manner, a uniform, automatic lubrication of the mandrel is assured, which can be varied as required, both with respect to the operating rhythm and with respect to the actual quantity of lubricant, and thus can be most accurately adapted to the requirements. More particularly in accordance with a further development of the invention, this result is also effectively achieved if the mandrel is no longer cooled externally by means of a stream of air, which frequently blows off the lubricant, but is provided with an internal duct through which a coolant in gas or liquid form can be conducted.

Figure 2:
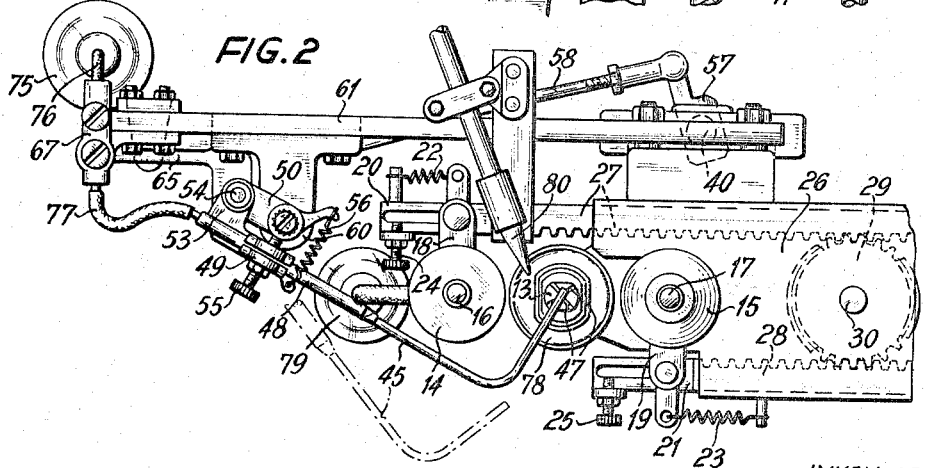
Figure 3:
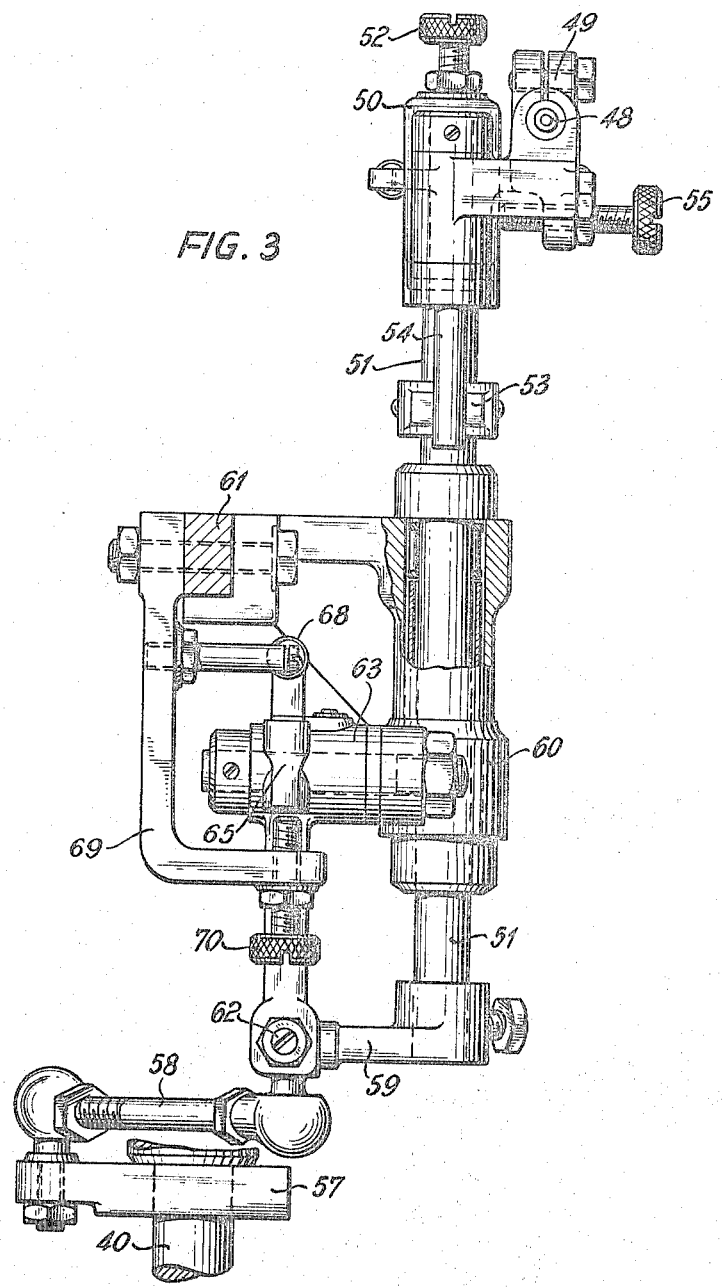
Figure 4:
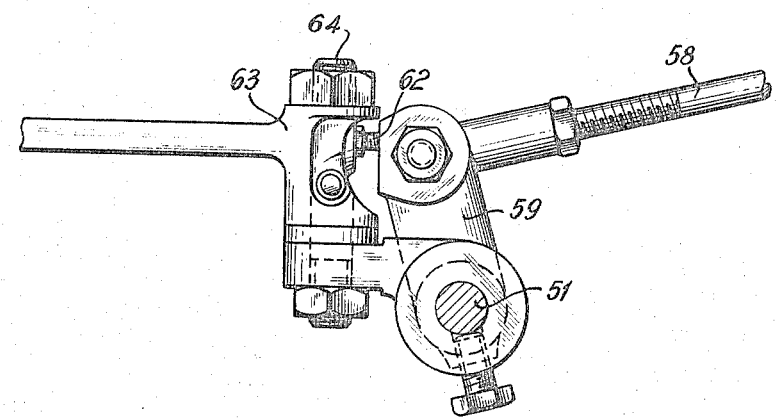
Figure 5:
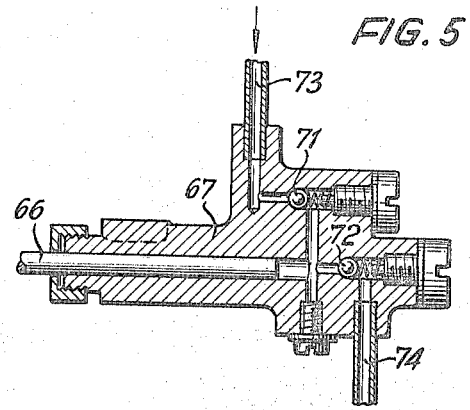

One working station developed according to the invention and on a machine for the manufacture of small glass bottles is illustrated by way of example in the drawing, wherein:

FIGURE 1 is a side elevation of the working station,
FIGURE 2 is a plan view of FIGURE 1,
FIGURE 3 is a front elevation of the transmission linkages for the lubricating device of the working station,
FIGURE 4 is a partial plan view of a detail, and
FIGURE 5 is a section through the piston pump used for the lubrication device.

In FIGURE 1, the reference 11 represents the supporting frame of a machine on which it is possible in known manner to manufacture relatively small glass vessels, more especially bottles from glass tubes. For this purpose, the frame 11 has mounted thereon a central hollow shaft, which in its turn carries a holder ring for the glass tube and intermittently rotates the said ring. Details of such an arrangement are known and consequently are not illustrated.

Included in the working stations of the machine is also a device, by means of which it is possible to shape the necks of the bottles which are to be manufactured. For this purpose, the frame 11 has fixed thereon a bracket 12, which carries a vertically adjustable mandrel 13 and two profiled rollers 14, 15 serving as shaping tools. The rollers are mounted to be rotatable on axles 16, 17, which in their turn, as shown in FIGURE 2, are mounted by means of rocker arms 18, 19 on slides 20, 21, the rocker arms being secured in a basic position by springs 22, 23 and abutments 24, 25.

The slides 20, 21 which are guided in the same plane in a housing 26, comprise rack sections 27, 28 on the sides which face one another, the said racks meshing with a common pinion 29. The latter in its turn is driven by a shaft 30 mounted in the bracket 12, whereby the rollers 14, 15 can be displaced in opposite directions.

In the example shown in the drawing, the mandrel 13 is a multi-part mandrel, and consists of a conical cap 31 which is screwed on to a tube 32. A relatively thin pipe conduit 33 is disposed in the said tube so that an annular space 34 is formed, and further reference will be made below to the function thereof. The complete mandrel is capable of being displaced vertically in a sleeve 35 of the housing 26. For this purpose, the tube 32 communicates by way of a lever mechanism 36, 37, 38 and a toothed segment 39 with a bevel gear 41 carried by a shaft 40. The mandrel 13 can consequently be alternately raised and lowered by the gearing chain which has been described, this taking place in accordance with the complete working cycle of the machine. Each time that a holder chuck 42 of the machine has brought a workpiece 43 into the position shown in FIGURE 1, the mandrel 13 will be lifted by its shift linkage until it engages into the said workpiece, whereupon the rollers 14, 15 are advanced laterally towards the bottle rim in order to form the neck 44 on the revolving workpiece.

According to the invention, the mandrel 13 is now automatically to be lubricated each time before it is raised into a workpiece 43. This is effected by means of a nozzle pipe 45 which consists of a small pipe and which has at its free end a small opening or jet 46 through which the lubricant can discharge so that it drips or sprays on to the cap 31 formed with distributing grooves 47.

The pipe 45, which is bent at an angle in the example shown in the drawing (FIGURE 2) is mounted by its thicker rearward end 48, as shown in FIGURE 3, in the clamp 49 of a headpiece 50, which is pushed on to a turnable shaft 51 in such a way that its exact height position can be regulated by means of a screw 52. The rocking movements of the shaft 51 are transmitted by means of a fork 53 and a pin 54 to the headpiece. At any time, the angular position of the headpiece 50 relatively to the shaft 51 (and thus of the nozzle 46 relatively to the mandrel 13) can be varied by means of a screw 55 which is threaded through the clamp 49 and is pulled by a spring 56 towards the headpiece.

In order to permit the nozzle of pipe 45 to co-operate appropriately with the mandrel 13, it requires on the one hand suitable pivoting movements of the parts 45, 48, 49 and on the other hand delivery at the correct time of measured quantities of lubricant. These two functions are combined as regards technical control in the constructional example of the invention.

The aforementioned shaft 40 which is mounted in the machine frame and which derives its movement from the main drive of the machine, and, as described, causes the lifting and lowering of the mandrel 13, carries an arm 57 to which is attached a guide bar 58, the latter in its turn being pivotally connected to a lever 59. This lever is mounted on the previously described rocker shaft 51 of the nozzle pipe 45, which shaft is guided in a bearing 60 of the projecting arm 61 connected to the housing 26.

As also shown in FIGURE 4, the lever 59 bears against an adjustable pin 62 of a bell crank lever 63, which is adapted to pivot about a shaft 64 (horizontal in the example of the drawing) at right-angles to the shaft 51 and the arm 65 of said lever is coupled to the piston 66 of a pump for the lubricant.

A spring 68 pulls the lever arm 65 against a setting screw 70 which is arranged in the bearing bracket 69 and by which the piston stroke and thus the quantity of lubricant to be delivered can be regulated.

FIGURE 5 shows a section through the pump 67. The piston 66 co-operates with two ball valves 71 and 72, which control the inlet 73 and the outlet 74. The former is connected to the supply vessel 75 through a conduit 76, while a conduit 77 leads from the outlet 74 to the nozzle pipe 45.

The lubrication arrangement which has been described operates as follows:

As soon as one working operation is completed in the region of the holder chuck 42, the control mechanism of the machine imparts a certain angular rotational movement to the shaft 40. This causes a lowering of the mandrel 13 (through the parts 41, 39, 38, 37, 36) but at the same time also a displacement of the guide bar 58, whereby on the one hand the shaft 51 and thus the nozzle pipe 45 are swivelled to a working position in which the pipe opening 46 will deliver lubricant to the mandrel 13, but on the other hand, through the bell crank lever 63, a delivery impulse is imparted to the pump 67, so that the mandrel now free from the glass regularly receives a predetermined quantity of lubricant. Any lubricant that runs off passes by way of the tray 78 into a collecting vessel 79.

For the appropriate lubrication of the mandrel, it is important that in operation it is not too cold and not too hot. In the former case, cracking of the glass is readily possible, but in the second case the undesired sticking effect can occur. Consequently, it can be essential, independently of the nature of the lubrication, for the mandrel to be cooled in suitable manner.

As already mentioned above, the procedure which is suitable for this purpose is for the hollow mandrel to be treated from inside with a coolant. This coolant is conveyed through the internal tube 33, for example under pressure, and discharges again through the interior of the cap 31 and the annular space 34. In this way, it can be controlled independently of the lubricating operation and of the burner 80, FIGURE 2, for example in a closed cycle, which passes through a pump, a heat exchanger, a thermostat 81 and a control valve 82, in such a way that the temperature and quantity of coolant are automatically regulated.

I claim:
1. A machine for manufacturing small glass bottles from glass tubing, including heating means for softening an open end portion of a glass tubing section, means for revolving said section about its longitudinal axis, shaping elements to press laterally against said end portion, a mandrel to extend into and position the open end of said end portion during the operation of said shaping elements, and means for moving said mandrel alternately to its working position and to an idle position away from said section, said machine further comprising displaceable means for applying lubricant to the working surface of said mandrel, including a lubricant transporting means having a lubricant applying device and being carried by a support that is displaceable to move said transporting means and thereby said device to and from a working position over said mandrel in idle position, and lubricant feeding means operated with movement of said displaceable means to feed a predetermined quantity of lubricant to said applying device and from the latter to said mandrel in timed relationship to the movements of said mandrel.

2. A machine for manufacturing small glass bottles from glass tubing, including heating means for softening an open end portion of a glass tubing section at a neck forming station, means for revolving said section about its longitudinal axis, shaping elements to press laterally against said end portion, a mandrel to extend into and position the open end of said end portion during the operation of said shaping elements, and means for moving said mandrel alternately to its working position and, after each neck forming operation, to an idle position away from said section, said machine further comprising a displaceable device for applying lubricant to the working surface of said mandrel, including a lubricant transporting pipe carried by a support that is displaceable to move said pipe to and from a working position over said mandrel in idle position, lubricant feeding means connected with said pipe, and mechanisms connected with the drive of said mandrel moving means for displacing said support and actuating said feeding means so as to discharge lubricant from said pipe in its working position onto said working surface of the mandrel in its idle position.

3. A machine according to claim 1, further comprising means for continuously circulating a cooling fluid inside said mandrel to keep it at a regulated working temperature.

4. A machine according to claim 2, said feeding means comprising a pump having a piston reciprocable to deliver a certain quantity of lubricant into said pipe, said mechanisms comprising a shaft rockable by said drive, a headpiece mounted on said shaft and carrying said support so as to swing said lubricant pipe to and from its working position, and means including an arm on said shaft and a lever driven by said arm for reciprocating said piston.

5. A machine according to claim 4, further comprising means respectively for adjusting the postion of said headpiece axially of said shaft and for adjusting the position of said support angularly relative to said headpiece, whereby to assure the desired working position of said lubricant pipe.

6. A machine according to claim 4, further comprising means for adjusting the distance of movement of said reciprocating means and thus the stroke of said piston whereby to regulate the quantity of lubricant fed to said mandrel.

7. A machine according to claim 4, said mandrel moving means comprising a driving rock shaft, a first bevel gear on said driving shaft, and lever means connected with said mandrel and carrying a second bevel gear meshing with said first bevel gear, for raising and lowering said mandrel, said driving shaft being connected with the aforementioned rockable shaft through a rod interconnecting arms on said shafts.

8. A machine according to claim 3, said mandrel being hollowed internally and mounted on the end of a vertically reciprocable tube, said fluid circulating means including a supply pipe extending axially within and spaced laterally from the side wall of said tube, means for feeding a cooling fluid through said supply pipe into the hollow of said mandrel, and means for conducting fluid from the space between said supply pipe and said tube.

9. A machine according to claim 3, and means including a heat exchanger and a thermostat in the path of circulation of said cooling fluid for regulating the temperature of said fluid.

References Cited

UNITED STATES PATENTS

| | | | |
|---|---|---|---|
| 3,141,752 | 7/1964 | Keller | 65—169 |
| 3,171,731 | 3/1965 | Barger et al. | 65—356 |
| 3,202,495 | 8/1965 | Zauner | 65—277 |

DONALL H. SYLVESTER, *Primary Examiner.*

S. LEON BASHORE, *Examiner.*

A. D. KELLOGG, *Assistant Examiner.*